(12) United States Patent
Purcell, Jr. et al.

(10) Patent No.: US 9,511,955 B2
(45) Date of Patent: Dec. 6, 2016

(54) MINERAL SUSPENDING AGENT, METHOD OF MAKING, AND USE THEREOF

(71) Applicant: Active Minerals International, Hunt Valley, MD (US)

(72) Inventors: Robert J. Purcell, Jr., Hunt Valley, MD (US); Dennis C. Parker, Hunt Valley, MD (US); Matthew J. Lyman, Hunt Valley, MD (US); James M. Smith, Hunt Valley, MD (US)

(73) Assignee: ACTIVE MINERALS INTERNATIONAL, LLC, Sparks, MD (US)

( * ) Notice: Subject to any disclaimer, the term of this patent is extended or adjusted under 35 U.S.C. 154(b) by 546 days.

(21) Appl. No.: 13/664,948

(22) Filed: Oct. 31, 2012

(65) Prior Publication Data

US 2014/0119841 A1    May 1, 2014

(51) Int. Cl.
| | | |
|---|---|---|
| *B65G 53/00* | (2006.01) | |
| *B65G 53/30* | (2006.01) | |
| *B09B 1/00* | (2006.01) | |
| *C04B 14/00* | (2006.01) | |
| *E21B 41/00* | (2006.01) | |
| *C04B 28/02* | (2006.01) | |
| *B09B 3/00* | (2006.01) | |
| *B09B 5/00* | (2006.01) | |
| *B09C 1/00* | (2006.01) | |
| *C04B 103/00* | (2006.01) | |
| *C04B 111/00* | (2006.01) | |

(52) U.S. Cl.
CPC ............... *B65G 53/30* (2013.01); *B09B 1/00* (2013.01); *B09B 3/00* (2013.01); *B09B 5/00* (2013.01); *B09C 1/00* (2013.01); *C04B 14/00* (2013.01); *C04B 28/02* (2013.01); *E21B 41/005* (2013.01); *C01P 2004/61* (2013.01); *C01P 2006/22* (2013.01); *C04B 2103/0079* (2013.01); *C04B 2111/00146* (2013.01)

(58) Field of Classification Search
CPC .................................................... B65G 53/30
USPC ................................................... 406/197
See application file for complete search history.

(56) References Cited

U.S. PATENT DOCUMENTS

| | | | | |
|---|---|---|---|---|
| 2,610,901 A | * | 9/1952 | Cross, Jr. ................... | 406/49 |
| 3,168,350 A | * | 2/1965 | Phinney et al. ............. | 406/197 |
| 3,179,496 A | * | 4/1965 | Skinner .................. | C01B 25/28 |
| | | | | 423/275 |
| 3,220,947 A | * | 11/1965 | Sawyer, Jr. ............ | C09K 8/206 |
| | | | | 507/110 |
| 3,384,419 A | * | 5/1968 | Anderson et al. ............. | 406/49 |
| 3,405,976 A | * | 10/1968 | Anderson et al. ............. | 406/49 |
| 3,509,066 A | * | 4/1970 | Jacobs .................... | C04B 33/13 |
| | | | | 106/468 |
| 3,990,748 A | * | 11/1976 | Ghusn et al. ............... | 406/115 |
| 4,062,694 A | * | 12/1977 | Sawyer, Jr. ................. | 106/473 |
| 4,089,669 A | * | 5/1978 | Sawyer, Jr. .............. | C05D 3/02 |
| | | | | 423/165 |
| 4,147,519 A | * | 4/1979 | Sawyer, Jr. ............. | C10L 1/322 |
| | | | | 44/281 |
| 4,155,741 A | * | 5/1979 | Scher .................... | B01J 13/02 |
| | | | | 424/419 |
| 4,251,230 A | * | 2/1981 | Sawyer, Jr. ............. | C10L 1/322 |
| | | | | 44/281 |

(Continued)

Primary Examiner — William R Harp
(74) Attorney, Agent, or Firm — Hauptman Ham, LLP

(57) ABSTRACT

A method of transporting solid particulates in an aqueous suspension of the solid particulates, comprising dispersing solid particulates in an aqueous liquid in the presence of at least one mineral suspending agent, wherein solid particulates are transported a distance greater than or equal to 200 m.

20 Claims, 12 Drawing Sheets

(56) References Cited

U.S. PATENT DOCUMENTS

| | | | | | |
|---|---|---|---|---|---|
| 4,422,855 | A | * | 12/1983 | Sawyer, Jr. | B01J 19/06 44/270 |
| 4,432,771 | A | * | 2/1984 | Sawyer, Jr. | C10L 1/326 406/197 |
| 4,496,367 | A | * | 1/1985 | Mathiesen | C10L 1/326 406/197 |
| 4,505,716 | A | * | 3/1985 | Sawyer, Jr. | C10L 1/326 406/197 |
| 4,770,708 | A | * | 9/1988 | Atkins | C04B 28/04 106/708 |
| 5,439,317 | A | * | 8/1995 | Bishop et al. | 405/129.2 |
| 6,130,179 | A | * | 10/2000 | Sampson | B01J 21/16 209/47 |
| 6,444,601 | B1 | * | 9/2002 | Purcell, Jr. | B01F 17/0028 209/47 |
| 7,727,939 | B2 | | 6/2010 | Bradbury et al. | |
| 2008/0179097 | A1 | * | 7/2008 | Eia | E21B 21/066 175/66 |

\* cited by examiner

MINERAL SUSPENDING AGENT, METHOD OF MAKING, AND USE THEREOF

FIELD

A composition, in the form of an aqueous suspension, comprising at least one mineral suspending agent present in an aqueous liquid in an amount sufficient to disperse solid particulates upon agitation. Although subject to many uses, in some embodiments, the composition is suitable for transporting solid particulates in an aqueous suspension comprising the solid particulates distances greater than 200 m. Although makeable by multiple methods, in some embodiments, the composition is made by dispersing the solid particulates in the aqueous liquid in the presence of the at least one mineral suspending agent. In some embodiments, the mineral suspending agent withstands high shear and resists degradation by attrition.

BACKGROUND

Moving mined minerals is performable by several methods. For example, sometimes minerals are suspended in water and transported from one location to another, sometimes over distances greater than or equal to 50 m, by flowing the aqueous suspension. If, for whatever reason, the flow stops or is substantially reduced, the suspended minerals begin to settle. Settled minerals, especially for hard-packing settling slurries, are inefficiently transported by flowing water.

Furthermore, the increasing volume of water and relatively low solids content of the suspension makes it less desirable to operate a pipeline, especially when the flow is regularly stopped or substantially reduced.

Some mining processes recover solids, grind the recovered solids, and transport the ground, recovered solids to a station using extremely large conveyor belts. Such transporting generates dust, which, depending on the solids, may influence the quality of the environment or its inhabitants. Furthermore, sometimes solids are dewatered and thereafter hauled to deepwater ports where the dewatered solids are to be loaded on shipping containers. These shipping containers are usually hauled to yet another deepwater port, where the dewatered solids are once again offloaded and hauled off. Not only does each loading and offloading create more dust but the deepwater ports also substantially increase the cost of hauling because of the significant cost required for making, maintaining, and using a deepwater port.

It is to be understood that both the foregoing general description and the following detailed description are representative and explanatory only and are not restrictive of the invention, as claimed.

The accompanying drawings, which are incorporated in and constitute a part of this specification, illustrate embodiments of the invention and together with the description, serve to explain the principles of the invention.

Each of FIGS. 2A-D is a plot of viscosity ($\eta$) versus shear rate $f(\dot{\gamma})$ for an iron ore slurry, and each of FIGS. 2E-H is a plot of shear stress versus shear rate $f(\dot{\gamma})$ for an iron ore slurry.

Figure 3:
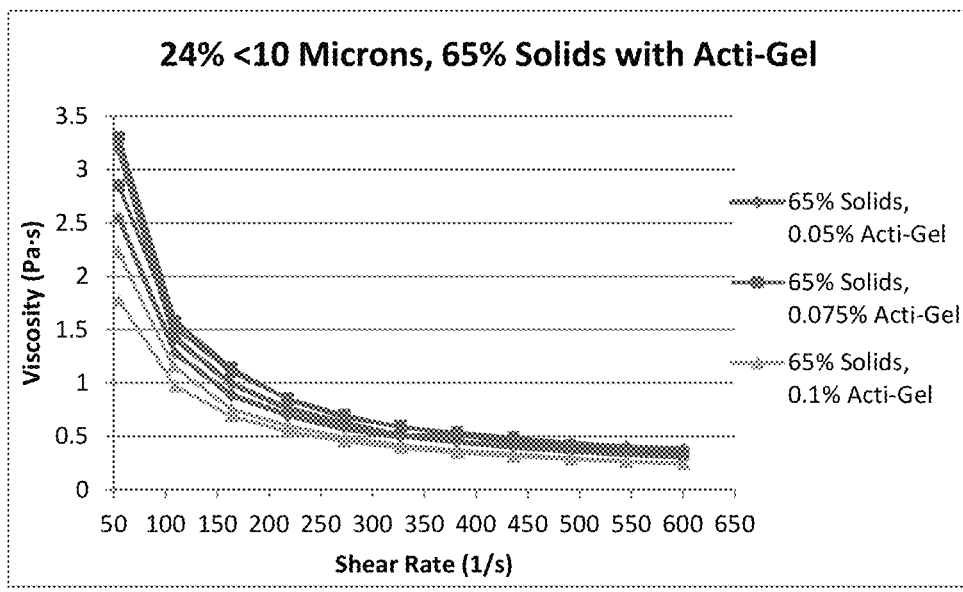

FIG. 3 is a plot of viscosity ($\eta$) versus shear rate $f(\dot{\gamma})$ for a bauxite slurry.

Figure 4:
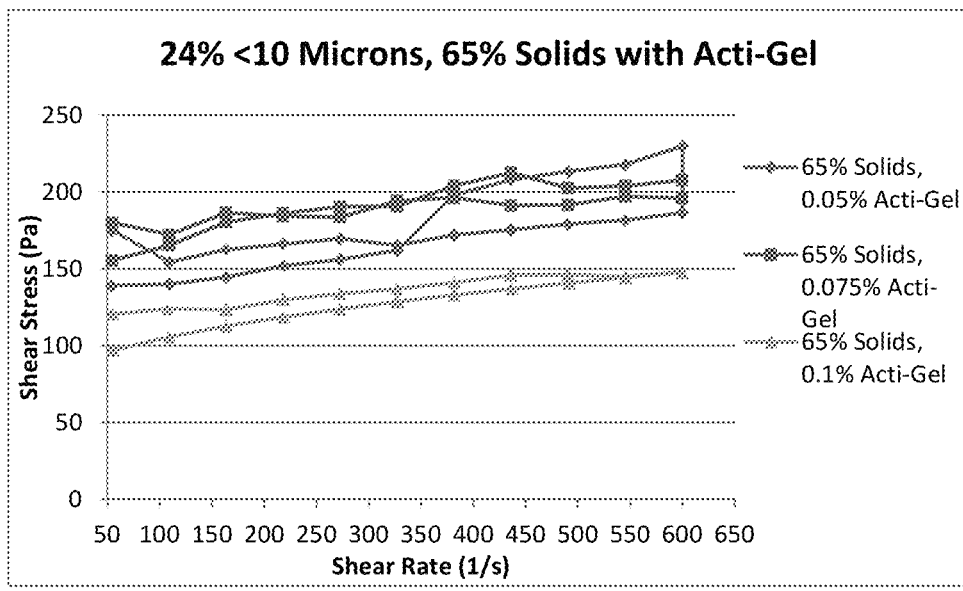

FIG. 4 is a plot of shear stress ($\tau$) versus shear rate $f(\dot{\gamma})$ for a bauxite slurry.

Figure 5A:
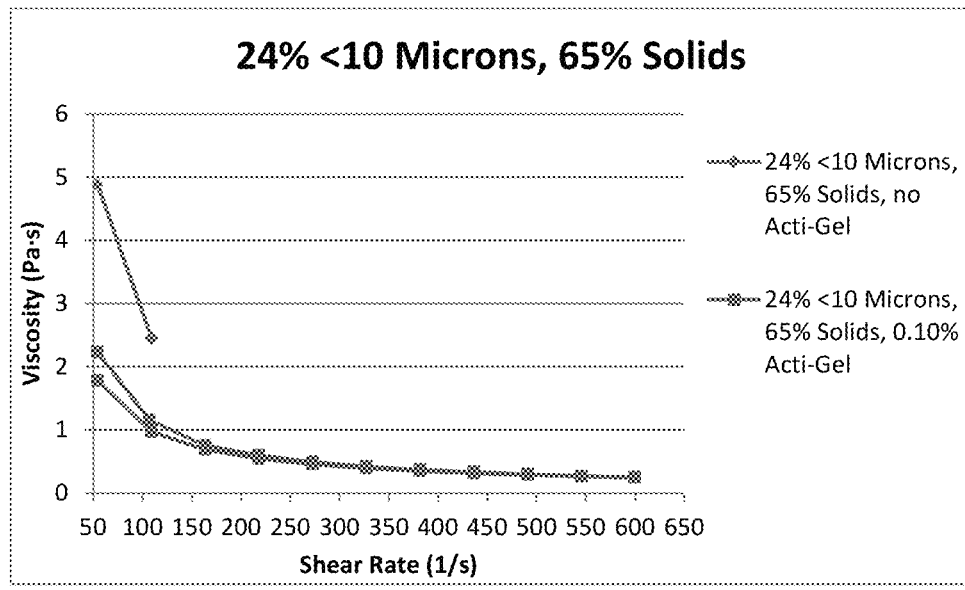
Figure 5B:
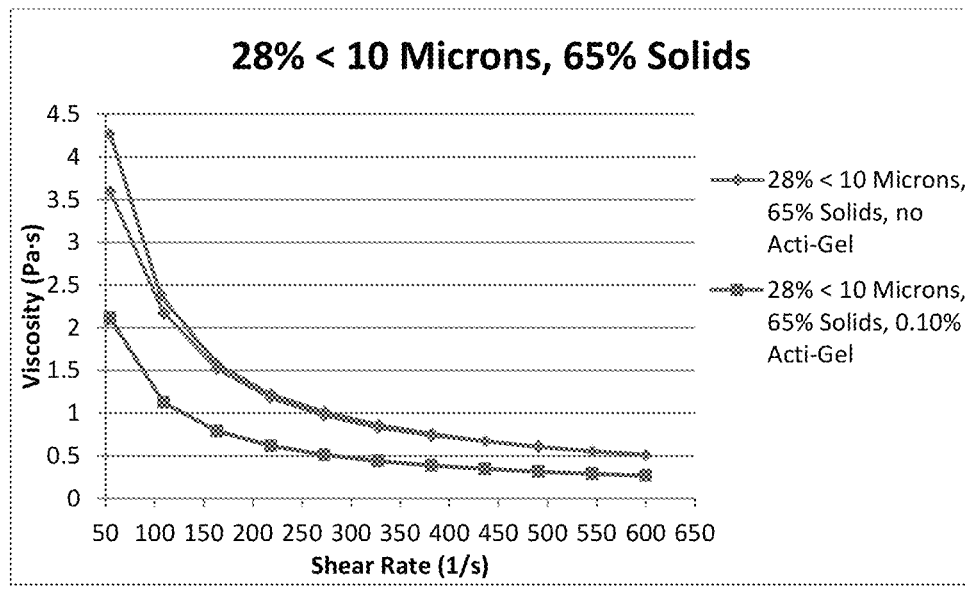
Figure 5C:
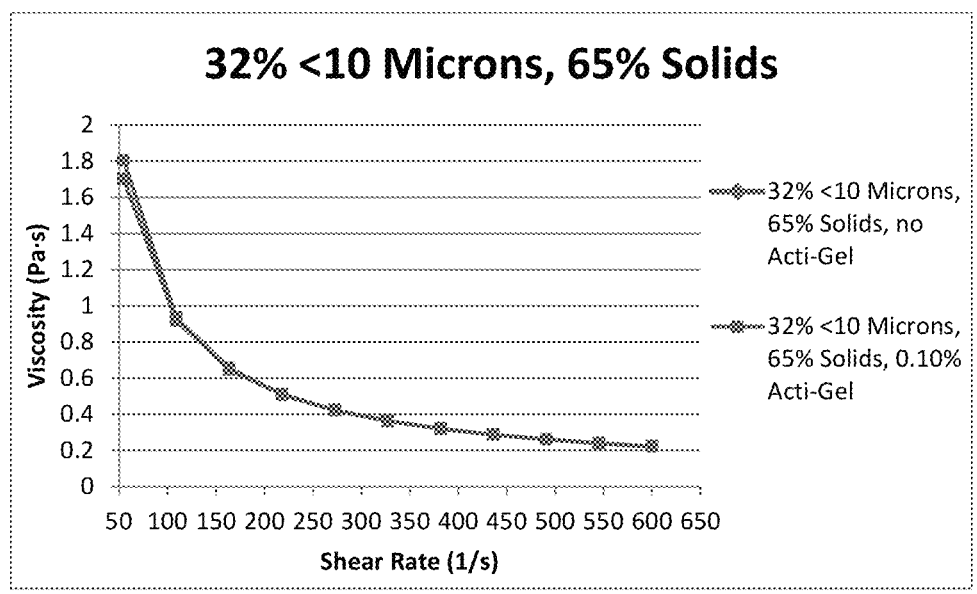

Each of FIGS. 5A-C is a plot of viscosity ($\eta$) versus shear rate $f(\dot{\gamma})$ for a bauxite slurry.

Each of FIG. 6A-F is a plot of viscosity ($\eta$) versus Brookfield RPM for a $TiO_2$ slurry.

Figure 7:
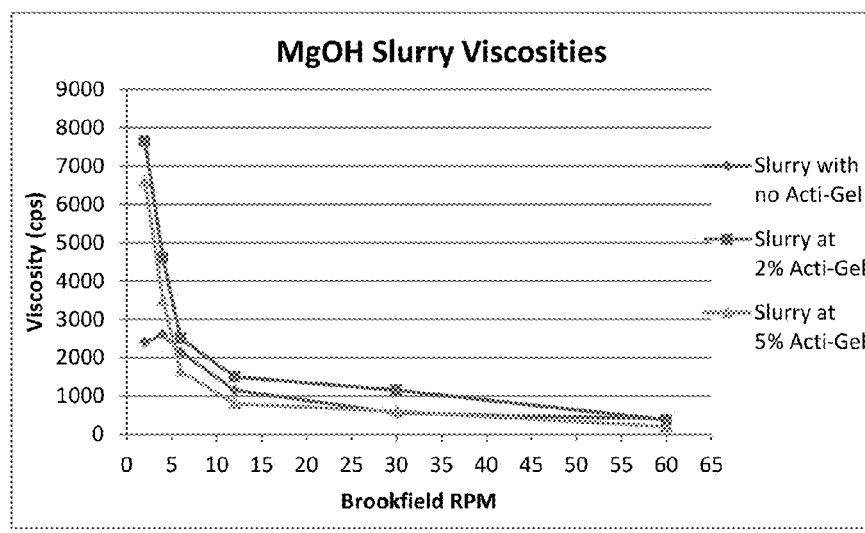

FIG. 7 is a plot of viscosity ($\eta$) versus Brookfield RPM for a MgOH slurry.

DESCRIPTION OF THE EMBODIMENTS

Reference will now be made in detail to the embodiments of the invention, examples of which are illustrated in the accompanying drawings.

A method of transporting solid particulates in an aqueous suspension of the solid particulates, comprising dispersing solid particulates in an aqueous liquid in the presence of at least one mineral suspending agent and/or optionally at least one additive in the dispersed and/or liquid phase, wherein solid particulates are transported a distance greater than or equal to 200 m.

As used herein, a suspension is a liquid in which solid particles are dispersed.

In some embodiments of an aqueous suspension, the liquid is water. In some embodiments of an aqueous suspension, the liquid comprises water and at least one other liquid. In some embodiments of an aqueous suspension, the water is present in an amount greater than 50% v/v relative to the total volume of the water plus the volume of the at least one other liquid. In some embodiments, the amount is greater than 60% v/v or 70% v/v or 96% v/v or 99% v/v. In some embodiments, the amount ranges from 75% to 95% v/v or from 80% to 90% v/v.

Water is obtainable from many sources. In some embodiments, the water is from sources of fresh water or sources of saline water. In some embodiments, the water is brackish or brine. In some embodiments, the water is from a source chosen from brine ponds, sea water, ocean water, lakes, ponds, and ground water.

In some embodiments, the at least one other liquid is an organic liquid. In some embodiments, the organic liquid is chosen from silicones, hydrocarbons, and alcohols. In some embodiments, the organic liquid is from tar sand, oil sand, and coal lignite. In some embodiments, the organic liquid is chosen from a glycol or a silicone. In some embodiments, the at least one other liquid is miscible with water or at least partially miscible with water. In some embodiments, the at least one other liquid is mined, e.g., in the process of gathering solid particulates. In some embodiments, the at least one other liquid is added, e.g., by a processing step before or after mining solid particulates or for any other reason.

In some embodiments, the aqueous phase of the liquid has a pH ranging from 2 to 13. In some embodiments, the pH ranges from 2 to 7 or from 4.5 to 9.5 or from 7 to 13. In some embodiments, the pH is adjusted using a neutralizer.

In some embodiments, the neutralizer is selected from gypsum, hydrated lime, ammonium nitrate, and aluminum sulfate. In some embodiments, the neutralizer is chosen from sodium hydroxide, caustic soda, hydrated lime, shell meal, limestone, burned lime, dolomite, sugar beet lime, and calcium silicate. In some embodiments, the neutralizer is chosen from aluminum sulfate, calcium chloride, lime sulfur, ferric sulfate, sulfuric acid, sulfur, and gypsum. In some embodiments, the neutralizer is selected from gypsum, hydrated lime, ammonium nitrate, and aluminum sulfate.

In some embodiments, at least one other solid substance is present in the aqueous liquid. In some embodiments, the at least one other solid substance is miscible in a component of the aqueous liquid phase, e.g., water. In some embodiments, the at least one other solid substance is immiscible in a component of the aqueous liquid phase. In some embodiments, the at least one other solid substance is in the source of water or is added in a process of gathering the solid particulates.

An aqueous suspension of the solid particulates is defined as from 5% to 95% by weight of solid particulates relative to the total weight of the water plus the dry weight of the solid particulates (% w/w). In some embodiments, the aqueous suspension of the solid particulates is present in an amount ranging from 10% to 90% w/w by weight of solid particulates relative to the total weight of the water plus the dry weight of the solid particulates. In some embodiments, the amount ranges from 20% to 85% w/w, 15% to 80% w/w or from 20% to 70% w/w or from 25% to 60% w/w.

The solid particles of the suspension are the solid particulates.

In some embodiments, the solid particulates are manmade, of natural origin, or mixtures thereof. In some embodiments, the solid particulates are inorganics, organics, or mixtures thereof.

In some embodiments, the solid particulates are chosen from rocks, mineral colloids, organic colloids, mineraloids, and minerals. Mixtures thereof are contemplated. In some embodiments, the solid particulates are mined.

In some embodiments, the solid particulates are chosen from polymers, metallic minerals, and fuels.

In some embodiments, the solid particulates are rocks, and in some embodiments, the rocks are chosen from limestone and gravel.

In some embodiments, the mineral colloids and organic colloids are from soil. In some embodiments, colloids are chosen from crystalline silicate clays, noncrystallinesilicate clays, iron and aluminium oxide clays (such as crystalline and noncrystalline varieties thereof), and organic colloid. In some embodiments, the organic colloid is humus.

In some embodiments, the solid particulates are industrial minerals. In some embodiments, the industrial minerals are chosen from aggregates, alunite, asbestos, asphalt (natural), barite, bentonite, borates, brines, carbonates, clays, ball clays, corundum, diamond, diatomite, feldspar, nepheline-syenite, fluorspar, Fuller's earth, garnet, gem minerals, granite, graphite, gypsum, kaolin, kyanite, sillimanite, andalusite, limestone, dolomite, marble, mica, olivine, perlite, phosphate, potash, potassium minerals, pumice, quartz, salt, slate, silica sand, Tripoli, soda ash, sodium bicarbonate, sodium sulfate, staurolite, sulfur, talc, vermiculite, wollastonite, and zeolites.

In some embodiments, the solid particulates are chosen from limestone, clays, sand, gravel, diatomite, kaolin, bentonite, silica, barite, gypsum, and talc.

In some embodiments, the solid particulates are chosen from coal, lignite, and peat.

In some embodiments, the solid particulates are chosen from cement, slag, and silica fume.

In some embodiments, the solid particulates are chosen from those comprising nickel, silver, diamond, and gold.

In some embodiments, the solid particulates are mineraloids, and in some embodiments the mineraloids are chosen from obsidian, amber, ilmenite, opal, amber, jet, and limonite.

In some embodiments, the solid particulates are chosen from minerals chosen from those in the silicate class, carbonate class, sulfate class, halide class, oxide class, sulfide class, phosphate class, element class, and organic class.

In some embodiments, the minerals are in the silicate class. In some embodiments, the silicates are in the form of rocks. In some embodiments, the silicates are chosen from feldspars, quartzes, olivines, pyroxenes, amphiboles, garnets, and micas.

In some embodiments, the minerals are in the carbonate class. In some embodiments, the carbonates are chosen from calcites, aragonites, dolomites, and siderites. In some embodiments, the carbonate is hanksite.

In some embodiments, the minerals are in the sulfate class. In some embodiments, the sulfates are chosen from anhydrites, celestines, barites, and gypsums. In some embodiments, the sulfates are chosen from chromate, molybdate, selenate, sulfite, tellurate, and tungstate minerals.

In some embodiments, the minerals are in the halide class. In some embodiments, the halide minerals are natural salts, such as, fluorites, halites, sylvites, and sal ammoniac. In some embodiments, the halide class is chosen from fluoride, chloride, bromide, and iodide minerals.

In some embodiments, the minerals are in the oxide class. In some embodiments, the oxide minerals are chosen from hematites, magnetites, chromites, spinels, ilmenites, and rutiles. In some embodiments, the oxide minerals are chosen from oxide and hydroxide minerals.

In some embodiments, the minerals are in the sulfide class. In some embodiments, the sulfide minerals are chosen from pyrite, chalcopyrite, pentlandite, and galena. In some embodiments, the sulfide minerals are chosen from selenides, tellurides, arsenides, antimonides, bismuthinides, and sulfosalts.

In some embodiments, the minerals are in the phosphate class. In some embodiments, the phosphate minerals are chosen from any mineral having a tetrahedral unit $AO_4$, in which A is chosen from phosphorus, antimony, arsenic or vanadium. In some embodiments, the phosphate mineral is apatite. In some embodiments, the phosphate minerals are chosen from arsenate, vanadate, and antimonate minerals.

In some embodiments, the minerals are in the elemental class. In some embodiments, the elemental minerals are chosen from gold, silver, copper, antimony, bismuth, graphite, and sulfur. In some embodiments, the elemental minerals are natural alloys, such as, electrum, phosphides, silicides, nitrides, and carbides.

In some embodiments, the minerals are in the organic class. In some embodiments, the organic minerals are chosen from oxalates, mellitates, citrates, cyanates, acetates, formates, and hydrocarbons. In some embodiments, the organic minerals are chosen from whewellite, moolooite, mellite, fichtelite, carpathite, evenkite, and abelsonite.

The solid particulates in the aqueous suspension of the solid particulates have a size sufficient for the solid particulates to be suspended. In some embodiments, the size is measured using D50. In some embodiments, the D50 ranges from about 0.0001 to 0.15 mm. In some embodiments, the D50 ranges from 0.00024 to 0.004 mm or 0.004 to 0.062 mm or from 0.063 to 0.125 mm. In some embodiments, D50 ranges from 0.00045 to 0.1 or from 0.01 to 0.08 mm. In some embodiments, the D50 ranges from about 0. 1 to 75 mm. In some embodiments, the D50 ranges from 0.25 to 50 mm or 0.4 to 40 mm or from 0.6 to 32 mm. In some embodiments, D50 ranges from 0.5 to 25 or from 1 to 20 mm.

In some embodiments, particle size distribution ranges from 10 μm to 10 mm.

In some embodiments, the aqueous suspension of the solid particulates has a size measured using D10. In some embodiments, the D10 ranges from about 0.0001 to 6.5 mm. In some embodiments, the D10 ranges from 0.0001 to 0.01 mm or 0.0024 to 4.0 mm or 0.04 to 2.0 mm or from 0.6 to 1.3 mm. In some embodiments, D10 ranges from 0.0045 to 1.0 mm or from 0.1 to 5.0 mm.

In some embodiments, the aqueous suspension of the solid particulates has a size measured using D90. In some embodiments, the D90 ranges from about 0.001 to 35 mm. In some embodiments, the D90 ranges from 0.01 to 32 mm. In some embodiments, D90 ranges from 0.0024 to 4.0 mm or 0.01 to 32 mm or 0.04 to 2.0 mm or from 0.6 to 1.3 mm. In some embodiments, D90 ranges from 0. 0045 to 1.0 mm or from 0.1 to 5.0 mm.

In some embodiments, the aqueous suspension of the solid particulates has a size measured using D10 and/or D50 and/or D90. In some embodiments, the values are any combination of those noted above for D10, D50, and D90. In some embodiments, D10 is from 0.0001 to 0.01 mm; D90 is from 0.01 to 32 mm; and D50 is from 0.0001 to 0.15 mm.

The size of the solid particulates (D10, D50, D90, etc.), in some embodiments, is manufactured using one or more sizing process. In some embodiments, the sizing process is chosen from filtering, straining, grinding, and pounding the solid particulates.

In some embodiments, the solid particulates changes size during transporting due to attrition. For example, mixing or shear sometimes causes the size of the solid particulates to decrease over time. As such, in some embodiments, the size is measured at the initiation of transporting.

In some embodiments, the solid particulates are round, but other shapes, such as rods, and angular surfaces are possible. In some embodiments, the solid particulates have members having various shapes. In some embodiments, the aspect ratio of the majority of particulates ranges from 1 to 1,000,000. In some embodiments, the aspect ratio of the majority of particulates is less than 25 or 100 or 1,000. In some embodiments, the aspect ratio of the majority of particulates ranges from 25 to 500 or from 1,500 to 15,000 or from 150,000 to 750,000.

As noted above, the aqueous suspension comprises an amount of at least one mineral suspending agent sufficient to disperse the solid particulates in the aqueous liquid. In some embodiments, the effective amount of the at least one mineral suspending agent ranges from 0.05% to 5.0% by weight relative to the total weight of the at least one mineral suspending agent and the solid particulates. In some embodiments, the effective amount ranges from 0.1% to 4.5% or from 0.4% to 3.0% or from 1% to 2%.

The above amounts of the at least one mineral suspending agent make it possible, in some embodiments, to increase the maximum percent by weight of the solid particulates from 2% to 6% compared to a corresponding aqueous suspension without the at least one mineral suspending agent.

In some embodiments, the at least one mineral suspending agent is a clay chosen from palygorskite, attapulgite, bentonite, montmorillonite, and sepiolite. In some embodiments, the at least one mineral suspending agent is palygorskite. In some embodiments, the palygorskite is from Attapulgus, Ga.

In some embodiments, the at least one mineral suspending agent is attapulgite. In some embodiments, the attapulgite is from a locality chosen from Palygorskaya, near the Popovka River, Perm, Russia; Attapulgus, Decatur Co., Georgia; at Tafraout, Morocco; and in the Hyderabad deposit, Andhra Pradesh, India. In some embodiments, the attapulgite is from Attapulgus, Decatur Co., Georgia. In some embodiments, the attapulgite is associated with other non-attapulgite minerals, such as montmorillonite, dolomite, calcite, talc, chlorite, quartz, and the like. In some embodiments, the attapulgite is substantially free of non-attapulgite minerals. Such purified attapulgite is, in some embodiments, available by using the methods in U.S. Pat. Nos. 6,444,601 and 6,130,179, each of which is incorporated herein in its entirety.

In some embodiments, the at least one mineral suspending agent is bentonite. In some embodiments, the bentonite is from a locality chosen from near Rock River, Wyoming and Mississippi. In some embodiments, the bentonite is chosen from calcium bentonite and sodium benonite. In some embodiments, the bentonite is substantially free of non-bentonite minerals. In some embodiments, the at least one mineral suspending agent is montmorillonite. In some embodiments, the montmorillonite is from a locality chosen from Montmorillon, Vienne, France; at Belle Fourche, Butte Co., S. Dak.; and at Clay Spur, near Newcastle, Crook Co., and at Strasburg, Shenandoah Co., Va. In some embodiments, the montmorillonite is associated with other non-montmorillonite minerals, such as cristobalite, zeolites, biotite, quartz, orthoclase, dolomite, and the like. In some embodiments, the montmorillonite is substantially free of non-montmorillonite minerals. In some embodiments, the at least one mineral suspending agent is sepiolite. In some embodiments, the sepiolite is from a locality chosen from in Little Cottonwood Canyon, Salt Lake Co., Utah; from Crestmore, Riverside Co., Calif.; at Ash Meadows, Nye Co., Nev.; and Cerro Mercado, Durango, Mexico. In some embodiments, the sepiolite is associated with other non-sepiolite minerals, such as dolomite. In some embodiments, the sepiolite is substantially free of non-sepiolite minerals.

In some embodiments, the aqueous suspension comprises a clay dispersant. In some embodiments, the clay dispersant is chosen from substances that, in an aqueous environment, absorb on the at least one mineral suspending agent and have the ability to disaggregate the at least one mineral suspending agent or to stabilize a suspension of the at least one mineral suspending agent. In some embodiments, the clay dispersant is chosen from condensed phosphates, polyacrylates, organic phosphonates, polysulfonates, sulfonated polycondensates, polymaleates, and polymers derived from natural products. In some embodiments, the clay dispersant is chosen from poly-anionic, poly-cationic, poly non-ionic, and poly-amphoteric dispersants that function as clay dispersants.

In some embodiments, the clay dispersant is chosen from tetrasodium pyrophosphate, sodium tripolyphosphate, condensed phosphate dispersants, and sodium salts thereof. In some embodiments, the clay dispersant is chosen from silicates, quaternary amines, petroleum, sulfonates, soda ash, and lime. In some embodiments, the silicates are chosen from sodium silicates and potassium silicates. In some embodiments, the lime is chosen from lime carbonates.

In some embodiments, the aqueous suspension comprises at least one wetting/dispersing agent in an amount ranging from 0.01% to 6% by weight relative to the weight of the at least one mineral suspending agent and the solid particulates. In some embodiments, the amount ranges from 0.05 to 4% or from 0.1 to 3.5%. The choice of a wetting/dispersing agent is not particularly limited and is sometimes added during processing of the solid particulates. In some embodiments, the at least one mineral suspending agent does not interfere with the wetting/dispersing agent, which is added, e.g., during processing of the solid particulates.

In some embodiments, the wetting/dispersing agent is low to non-foaming in water and has a structure comprising an organic portion that is capable to adsorb onto the surface of the suspended solid particulate. If, e.g., the solid particulate comprises organic particles (e.g., coal, peat, and the like), the wetting/dispersing agent has a charged hydrophilic portion that is compatible to the continuous phase (e.g., water). If, e.g., the solid particulate comprises inorganic particles, the wetting dispersing agent has an organic portion that is capable to adsorb onto the surface of inorganic particles (Bauxite, Iron Ore, Sand, Copper, Molybdenum, Talc, Titanium Dioxide, Calcium Carbonate, Potash, other Industrial Minerals, and the like) and a charged hydrophilic portion that is compatible to the continuous phase (e.g., water).

In some embodiments, the at least one wetting/dispersing agent is chosen from poly anionic organic dispersants, poly cationic organic dispersants, poly non-ionic organic dispersants, poly amphoteric organic dispersants that function as organic (e.g., coal, peat, and the like) particulate dispersants, and poly amphoteric organic dispersants that function as inorganic (Bauxite, Iron Ore, Sand, Copper, Molybdenum, Talc, Titanium Dioxide, Calcium Carbonate, Potash, other Industrial Minerals, and the like) particulate dispersants.

In some embodiments, the at least one wetting/dispersing agent for the particulate is chosen from salts of condensed naphthalene formaldehyde sulfonates, polymerized salts of alkyl naphthalene sulfonic acids, salts of polymerized substituted benzoic alkyl sulfonic acids, salts of ligno sulfonates, and salts of polyacrylates.

In some embodiments, additives, other than those noted above, are added to the aqueous suspension. In some embodiments, additives are chosen from substances added for processing the solid particulates or water sources.

In some embodiments, the suspension is made by dispersing solid particles in the aqueous liquid through agitation in the presence of at least one mineral suspending agent. In some embodiments, the agitation is in the presence of one or more additives. In some embodiments, the agitation is in the presence of at least one wetting/dispersing agent and/or at least one clay dispersing agent.

The aqueous liquid, solid particulates, and the at least one mineral suspending agent are mixed in any order. In some embodiments, the aqueous liquid, solid particulates, the at least one mineral suspending agent, and/or optionally the at least one dispersing agent for the at least one mineral suspending agent, and/or optionally the at least one wetting/dispersing agent for the solid particulates, and/or one or more additional additives (a neutralizer, the at least one other solid substance, and the others noted herein) are mixed in any order.

In some embodiments, both the aqueous liquid and solid particulates are added to the at least one mineral suspending agent. In some embodiments, both the at least one mineral suspending agent and the solid particulates are added to the aqueous liquid.

In some embodiments, agitation is sufficient to substantially homogenize the aqueous suspension. In some embodiments, the agitation is sufficient to homogenize the aqueous suspension. In some embodiments, the homogenization makes is possible for the solid particulates to settle in a manner inconsistent with that predicted by Stokes Law of settling.

In some embodiments, the aqueous suspension is an inhomogeneous aqueous suspension.

In some embodiments, the agitation is mechanical. In some embodiments, the agitation is chosen stirring, pumping, and milling. In some embodiments, the solid particulates are present in an amount sufficient to create shear forces on the aqueous liquid and to facilitate homogenization of the aqueous suspension. In some embodiments, agitation is the result of concrete drilling, ultrasound dispersing, or cavitation.

In some embodiments, the mineral suspending agent is added in the form of a powder clay. In some embodiments, the powder clay is dry before the addition.

In some embodiments, the mineral suspending agent is added in the form of a pre-gel consisting of the at least one mineral suspending agent and water. In some embodiments, the pre-gel consists of from 1% to 15% of the at least one mineral suspending agent by weight and the remainder water. In some embodiments, the water has a pH chosen from values already disclosed herein regarding the liquid phase of the aqueous suspension. In some embodiments, the water comprises at least one neutralizer chosen from those already disclosed herein regarding the liquid phase of the aqueous suspension.

In some embodiments, the mineral suspending agent is added in the form of a pre-dispersion consisting of the at least one mineral suspending agent, a clay dispersant, and water. In some embodiments, the pre-dispersion consists of from 1% to 45% of the at least one mineral suspending agent by weight, from 0.05 to 1.0% by weight of the clay dispersant, and the remainder water. In some embodiments, the water has a pH chosen from values already disclosed herein regarding the liquid phase of the aqueous suspension. In some embodiments, the water comprises at least one neutralizer chosen from those already disclosed herein regarding the liquid phase of the aqueous suspension.

In some embodiments, the aqueous suspension is made by adding a wetting/dispersing agent to an aqueous liquid; and thereafter adding at least one mineral suspending agent; and thereafter adding solid particulates with agitation.

In some embodiments, the aqueous suspension is made by preparing a mineral suspending agent in the form of a pre-gel adding a dispersing agent for the at least one mineral suspending agent to the aqueous liquid; adding the pre-gel to said slurry water; and thereafter adding at least one mineral suspending agent; and thereafter adding solid particulates with agitating.

In some embodiments, the aqueous suspension is made by preparing a mineral suspending agent in the form of a pre-dispersion by adding a clay dispersant and a clay to the aqueous liquid while agitating and continuing to agitate until the clay is dispersed to form a pre-dispersion; adding a dispersing agent for the at least one mineral suspending agent to the aqueous liquid; adding said mineral suspending agent in the form of a pre-dispersion to the aqueous liquid; and adding solid particulates with agitation.

The aqueous suspension makes it possible to transport minerals long distances. Transporting is facilitated by the addition of an effective amount of at least one mineral suspending agent.

In some embodiments, the solid particulates are transported a distance greater than or equal to 200 m. In some embodiments, the distance is greater than or equal 0.600 km or 5 km or 10 km. In some embodiments, the distance ranges from 40 km to 500 km or from 100 km to 420 km or from 200 km to 380 km.

In some embodiments, transportation comprises flowing the aqueous suspension of solid particulates in a conduit. In some embodiments, the conduit comprises a pipeline, weirs, u-shaped structures, moving conveyers, and other structures to convey water over distances greater than 200 m. In some embodiments, the pipes in the pipeline have in inner diameter of at least 1.28 cm or 5 cm or 300 cm. In some embodiments the pipes have an inner diameter ranging from 1.28 cm to 200 cm or from 5 cm to 100 cm or from 10 cm to 75 cm. In some embodiments, the conduits, pipelines, u-shaped structures, weirs, moving conveyers and other structures to convey water over distances greater than 200 m have a transverse dimension of at least 1.28 cm or 5 cm or 100 cm. In some embodiments, the conduits, pipelines, u-shaped structures, weirs, moving conveyers and other structures to convey water over distances greater than 200 m have a transverse dimension ranging from 1.28 cm to 300 cm or from 10 cm to 200 cm or from 75 cm to 150 cm.

In some embodiments, the transporting comprises flowing the aqueous suspension of the solid particulates in the conduit such that the solid particulates are transported the entire distance. In some embodiments, the transporting comprises flowing the aqueous suspension of the solid particulates in the conduit such that the solid particulates are transported the at least 200 m of the distance.

In some embodiment, during transporting by flowing the aqueous suspension, the flowing has a Renyolds number below 4,000. In some embodiments, the Renyolds number is below 2,000. In some embodiments, the Renyolds number ranges from 2,000 to 3,000 or from 500 to 1,750.

In some embodiments, during transporting by flowing, the flowing changes in rate by at least 10% or 25% or 50%.

In some embodiments, transporting comprises pumping the aqueous suspension. In some embodiments, transporting is further facilitated by gravity and the placement of the conduit.

In some embodiments, the aqueous suspension is stored in a container suitable for storing an aqueous suspension of solid particulates. In some embodiments, the containers are chosen from the conduit and shipping containers. In some embodiments, the shipping containers are chosen from intermodial freight containers, intermediate bulk shipping containers, drums, unit load devices, and specialized shipping containers suitable for an aqueous suspension of solid particulates.

In some embodiments, the storage is for a period is greater than 8 hours. In some embodiments, the storage is for a period ranging from 8 hours to 90 days. In some embodiments, the storage is for a period ranging from 7 to 70 days or from 20 to 60 days or from 30 to 40 days. In some embodiments, the storage period is from 30 days to one year.

In some embodiments, the aqueous suspension is stored on the conduit, because the flow of the aqueous suspension has never started or is interrupted.

In some embodiments, after transporting by flowing the aqueous suspension, the aqueous suspension of the solid particulates is collected in a shipping container. The shipping container is thereafter suitable for storing and/or hauling the container containing the aqueous suspension of solid particulates a second distance greater than or equal to 100km. In some embodiments, the hauling the stored aqueous suspension of solid particulates is achieved using a vehicle chosen from trains, trucks, planes, and ships. After reaching its destination, the stored and transported aqueous suspension of solid particulates is, in some embodiments, further transported yet again (as described herein above) for yet another distance greater than or equal to 200 m by flowing the aqueous suspension of the solid particulates in a second conduit (as described herein above).

In some embodiments, transporting solid particulates in an aqueous suspension of the solid particulates, comprising dispersing, in a shipping container, solid particulates in an aqueous liquid in the presence of at least one mineral suspending agent, and thereafter hauling the container a distance greater than or equal to 100 km. Of course, during the hauling, the aqueous suspension is stored (as described herein above).

In some embodiments, the aqueous suspension is stored before the solid particulates are transported. In some embodiments, the aqueous suspension is stored while the solid particulates are hauled. In some embodiments, the aqueous suspension is stored after it is transported.

In some embodiments, during storage and/or transporting, settling of the solid particulates occurs in a manner inconsistent with that predicted by Stokes law of settling. In some embodiments, the aqueous suspension prevents hard-packing.

In some embodiments, the aqueous suspension is a non-settling slurry. A non-settling slurry is a homogeneous aqueous suspension which does not settle for 24 hours.

EXAMPLE 1

The purpose of this example is to test the rheological properties of an iron ore slurry in the presence and in the absence of a mineral suspending agent.

Iron ore slurries having a solids weight percentage of 70% and 74% were received from an Iron Ore Slurry Pipeline Operator. The liquid phase is water. Both slurries were hard settled or packed in the bottom of the containers. Clearly, these suspensions were inadequate for flowing in a pipeline.

Aqueous suspensions were prepared as shown in table 1.

TABLE 1

Aqueous Suspensions of iron ore

| Sample | Sw | AG weight relative to solids weight |
|---|---|---|
| A | 70 | 0.0 |
| B | 70 | 0.05 |
| C | 70 | 0.075 |
| D | 70 | 0.1 |
| E | 74 | 0.1 |
| F | 68 | 0.0 |

Sw = solids weight percentage;
AG = (ActiGel 208 ®, available from Active Mineral International).

For samples A-D, the 70% solids slurry was divided into four fractions, and aqueous suspensions were made by mixing 0%, 0.05%, 0.075%, and 0.10% by weight of the solids weight percentage of a mineral suspending agent (ActiGel 208®, available from Active Mineral International).

Similarly, for sample E, the aqueous suspension was made by mixing 0.10% weight of the solids weight percentage of a mineral suspending agent (ActiGel 208®, available from Active Mineral International).

Samples A-E were re-suspended using a concrete drill to agitate the mixtures.

For Samples B-E, no hard-packing was observed for 60 days using the rod penetrometer test AMI-WI-ORE-003 By way of comparison, Sample A hard-packed within one hour. Based on these observations, Samples B-E were storable for 60 days without hard-packing or need of re-suspension. Thus, Samples B-E are suitable for hauling long distances and/or storing for an analogous time period.

Samples B-E were qualitatively observed to determine that both coarse and fine solid particulates were suspended.

Figure 1:
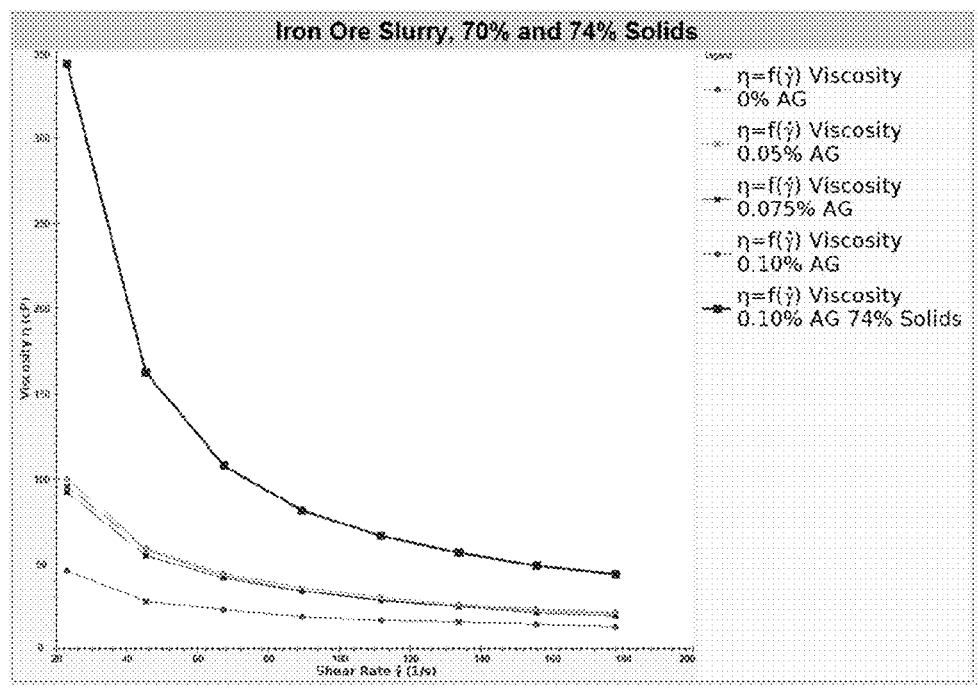
FIG. 1 is a plot of viscosity ($\eta$) versus shear rate $f(\dot{\gamma})$ for an iron ore slurry.
Figure 2A:
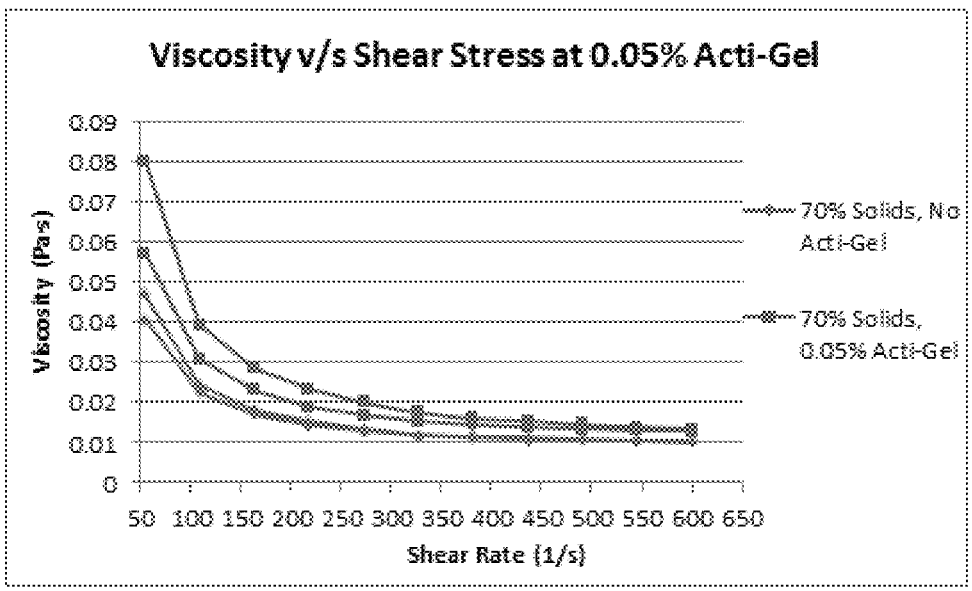
Figure 2B:
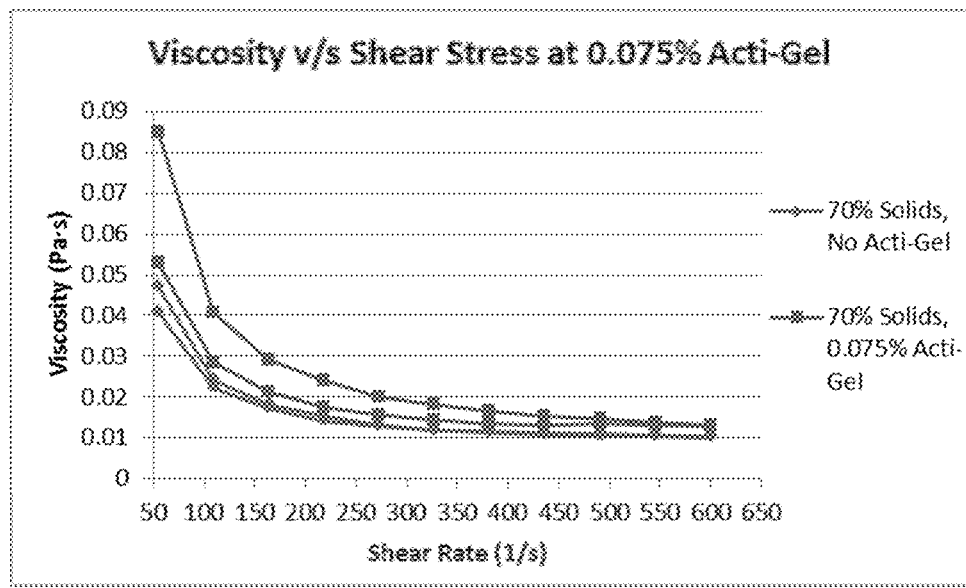
Figure 2C:
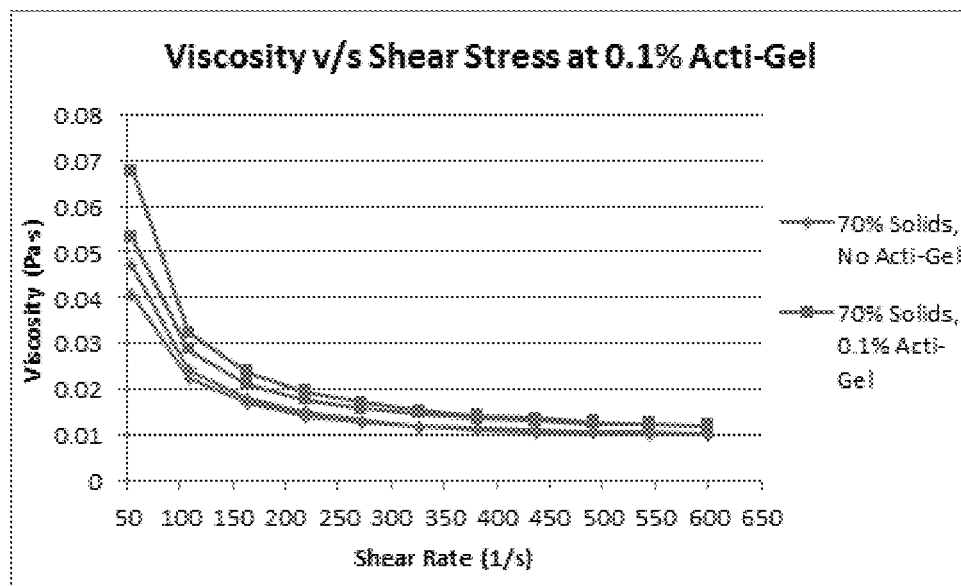
Figure 2D:
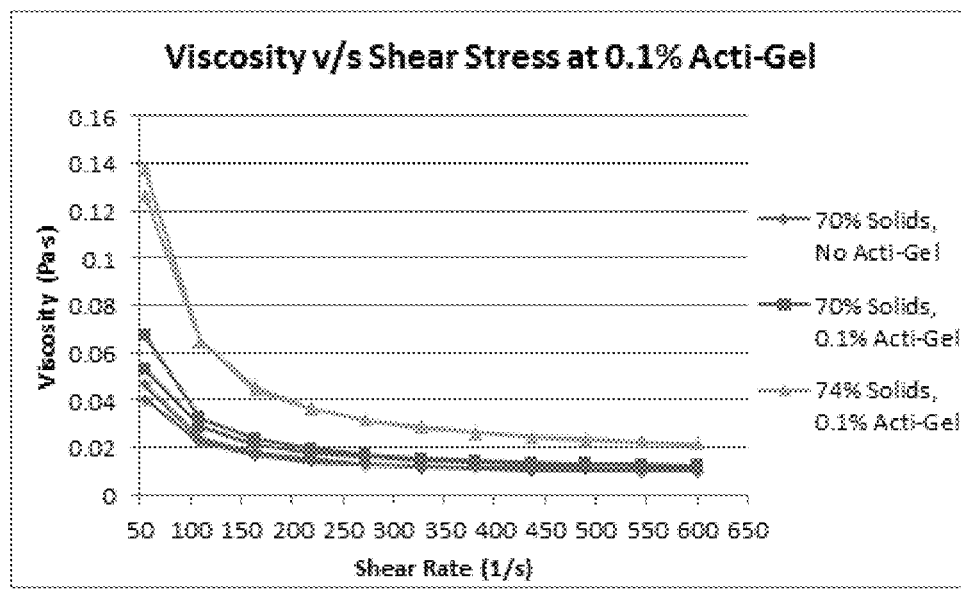
Figure 2E:
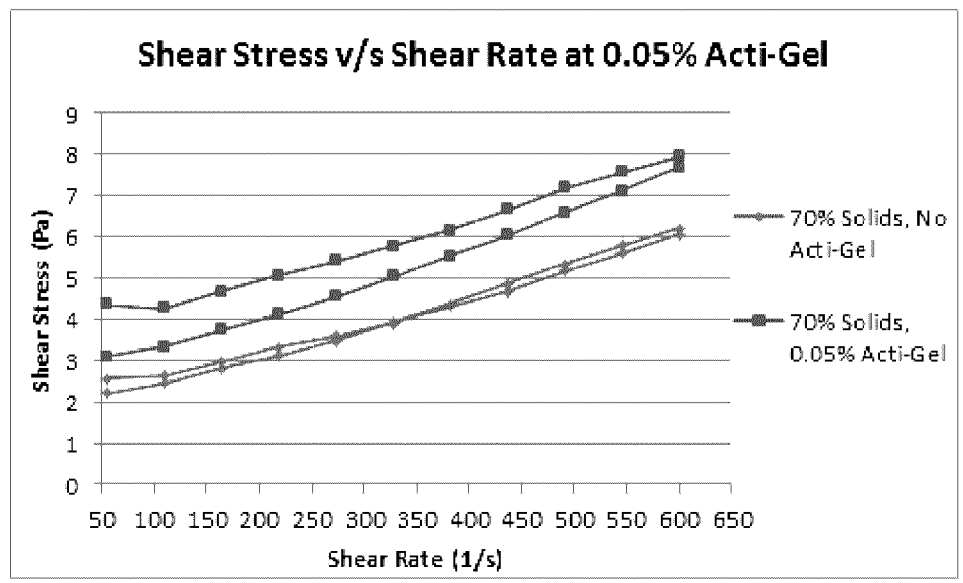
Figure 2F:
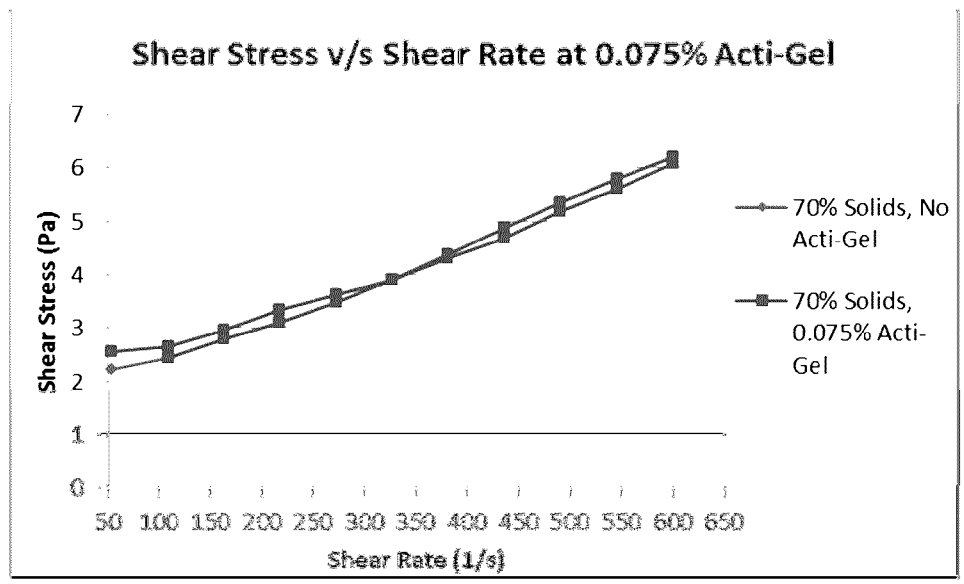
Figure 2G:
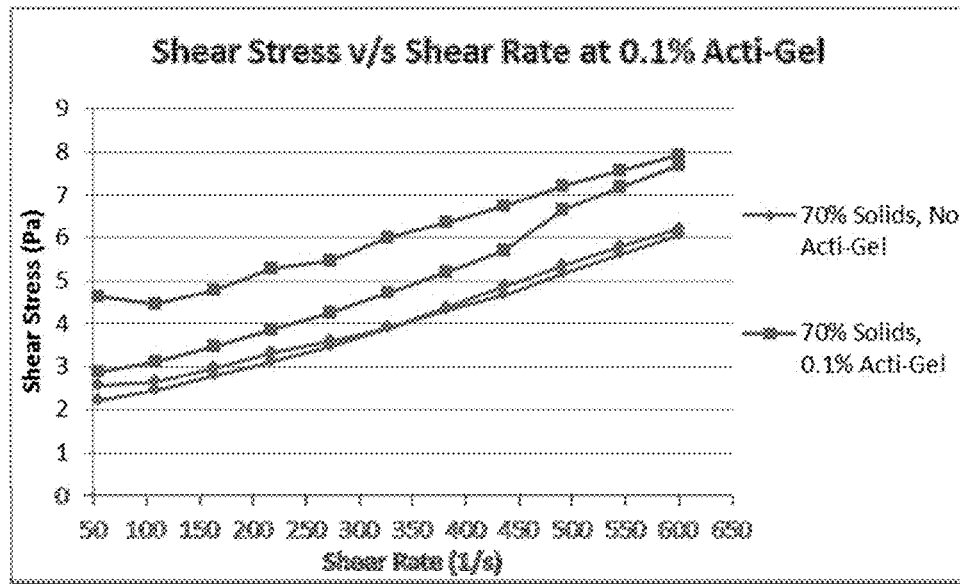
Figure 2H:
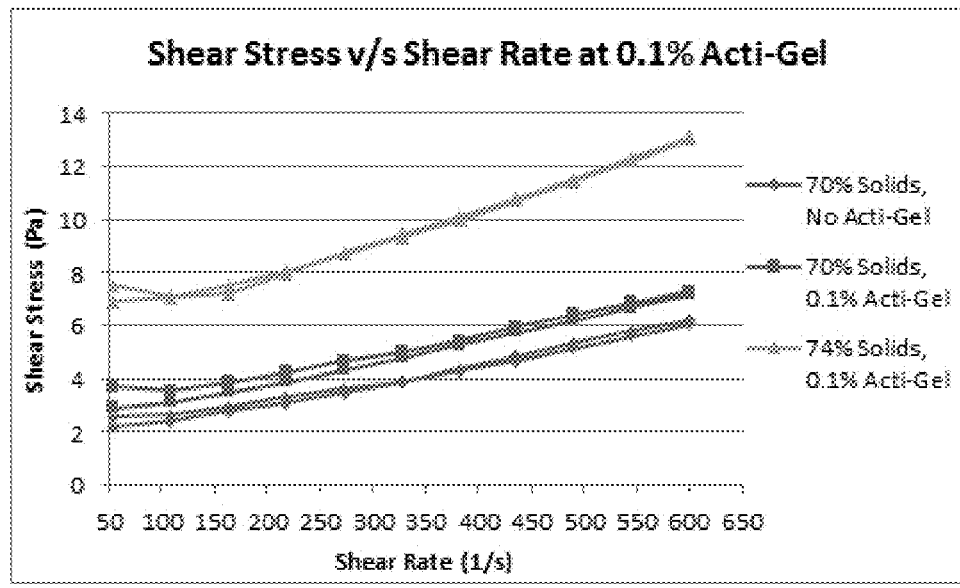

For Samples B-E, viscosity measurement profile tests were run using a Brookfield RS+ Rheometer Concentric Cylinder CC-40 with: 20 mm and 21 mm radius for bob and cup, 1 mm gap; Software: Rheo 3000 ; Program Profile: Samples B-E were run in the Step Program using shear rates of: 178 $s^{-1}$, 156 $s^{-1}$, 134 $s^{-1}$, 112 $s^{-1}$, 89 $s^{-1}$, 67 $s^{-1}$, 45 $s^{-1}$, and 23 $s^{-1}$. These results are shown in FIG. 1, which is a plot of viscosity ($\eta$) versus the shear rate f($\dot{\gamma}$) for each Sample B-E.

The change in viscosity ($\eta$) at lower shear rates f($\dot{\gamma}$) for each Sample B-E indicates that minimal energy is sufficient to alter the aqueous suspensions from a static state to a flowing state and relatively low energy expenditures are sufficient to flow Samples B-E. Furthermore, Samples B-E have from 2 to 6 solids weight percent higher than Sample F, a comparison sample used for iron ore. Stated differently, Samples B-E have 2.9 to 8.8% higher solids weight percentage than comparison Sample F.

Next, the viscosity measurement profile was repeated using the same equipment and conditions but the systems were checked for hysteresis. The Rheometer was ramped at shear rates from 0 $s^{-1}$ to 600 $s^{-1}$ over 90 sec; no hold, and then ramped from 600 $s^{-1}$ to 0 $s^{-1}$ over 90 sec. These results are shown in FIGS. 2A-D, which is a plot of viscosity ($\eta$) versus shear rate f($\dot{\gamma}$). Also shown in FIGS. 2E-H are plots of the shear stress versus shear rate f($\dot{\gamma}$) under analogous conditions.

Each of FIGS. 2A-H demonstrates that Samples B-E have no minimal velocity. Furthermore, the lack of hystersis means, e.g., that pipeline operators do not necessarily have to keep track of the history of flow rates to efficiently operate the pipeline.

Each sample B-E is suitable for transporting by flowing in a conduit.

EXAMPLE 2

A Bauxite slurry samples from a bauxite mining and slurry pipeline company having 65% solids weight percent and a particle size of 24%<10 μm were received.

Aqueous suspensions were prepared as shown in Table 2 below.

TABLE 2

Bauxite slurry samples

| Sample | Bauxite Particle size | Sw (%) | AG weight relative to solids weight | | | |
|---|---|---|---|---|---|---|
| | | | A | B | C | D |
| 1 | 24% < 10 μm | 65 | 0% | 0.05 | 0.075 | 0.10 |
| | | 60 | | | | |
| | | 55 | | | | |
| | | 50 | | | | |
| 2 | 28% < 10 μm | 65 | 0% | 0.05 | 0.075 | 0.10 |
| | | 60 | | | | |
| | | 55 | | | | |
| 3 | 32% < 10 μm | 65 | 0% | 0.05 | 0.075 | 0.10 |
| | | 60 | | | | |
| | | 55 | | | | |

Sw = Solids weight percentage.
AG = (ActiGel 208 ®, available from Active Mineral International).
The nomenclature is as follows: Sample-#-Sw-(letter A, B, C, D). The # denotes the bauxite particle size; Sw denotes the solids weight percentage yy %, in which yy % = 65%, 60%, 55%, or 50%; and the Letter A, B, C, D represent the amount of AG, and For example, Sample 1-65-A has a bauxite particle size of 24% < 10 μm, 65% solids weight percent, and 0% of AG. Sample 3-60-C has a bauxite particle size of 32% < 10 μm, 60% solids weight percent, and 0.075% of AG, etc.

For Samples 1-65-A-D, the 65% solids slurry was divided into four fractions, and aqueous suspensions were made by mixing 0%, 0.05%, 0.075%, and 0.10% by weight of the solids weight percentage of a mineral suspending agent (ActiGel 208®, available from Active Mineral International).

The process was repeated for Samples 1-60-A-D, 1-55-A-D etc. until the 40 samples in Table 2 were prepared.

All Slurries, as received (Samples 1-yy-A; 2-yy-A; & 3-yy-A, in which yy=50, 55, 60, or 65 as shown in table 2), were hard-packed in the bottom of the containers. Thus, these Samples were not suitable for transporting by flowing in a pipeline.

The various slurries were re-suspended using a concrete drill and mixing equipment.

Viscosity profile measurements were made using a Brookfield RS+ Rheometer, Concentric Cylinder CC-40, 20 mm and 21 mm radius for bob and cup, 1 mm gap, Software: Rheo 3000. Program Profile: Slurries were run using a shear rate ramped from 0 $sec^{-1}$ to 600 $sec^{-1}$ over 90 sec, no hold, and then ramped from 600 $sec^{-1}$ to 0 $sec^{-}$ over 90 sec. The results are shown in FIGS. 3-5.

The results in FIG. 3 plot of viscosity ($\eta$) versus the shear rate f($\dot{\gamma}$) for the four Samples 1-65-B-D, each having a 65% solids weight percentage and a particle size of 24%<10 μm, i.e., the coarsest with the highest solids of example 2. Sample 1-65-A, i.e., the one with 0% mineral suspending agent, was too thick to run on the Brookfield and thus not suitable for transporting by flowing in a pipeline. Nor are these data for Sample 1-65-A shown, because the settling rate is too high. (Similarly, nor are data for Sample 3-65-A shown, because the settling rate is too high.)

These data also show that remaining three Samples 1-65-B-D use a minimal amount of energy to alter the aqueous suspensions from a static state to a flowing state and relatively low energy expenditures are sufficient to flow Samples 1-65-B-D. Furthermore, the lack of hysteresis makes it easier for a pipeline operator to monitor Samples 1-65-B-D during flowing for analogous reasons to those noted in Example 1.

The results in FIG. 4 plot shear stress ($\tau$) versus the shear rate f($\dot{\gamma}$) for the four Samples 1-65-A-D, each having a 65% solids weight percentage and a particle size of 24%<10 μm, i.e., the coarsest with the second highest solids of example 2. Sample 1-65-A, i.e., the one with 0% mineral suspending agent, was too thick to run on the Brookfield and thus not suitable for transporting by flowing in a pipeline.

These data also show that remaining three Samples 1-65-B-D use a minimal amount of energy to alter the aqueous suspensions from a static state to a flowing state and relatively low energy expenditures are sufficient to flow Samples 1-65-B-D. Furthermore, the lack of hysteresis makes it easier for a pipeline operator to monitor Samples 1-65-B-D during flowing for analogous reasons to those noted in Example 1.

The results are in FIGS. 5A-D, which are plots of viscosity ($\eta$) versus the shear rate f($\dot{\gamma}$) for Samples-1-65-A; 2-65-A; 3-65A, i.e., the samples with 65% solids weight percent and no AG; and for Samples 1-65-D; 2-65-D; 3-65D, i.e., the samples with 65% solids weight percent and 0.10% AG.

Sample-1-65-A, i.e., with the least fines added at 24%<10 μm, was too thick to run without the mineral suspending agent. Sample-1-65-A is clearly not suitable for flowing in a pipeline. See FIG. 5A.

As seen for Samples 1-65-D; 2-65-D; & 3-65D, the particle size (the amount of fine particles) has little effect on the efficiency of the mineral suspending agent. Each Samples 1-65-D; 2-65-D; & 3-65D is suitable for flowing in a pipeline. See FIGS. 5A-C.

No hard packing occurred with any sample comprising AG (1-65-D; 2-65-D; & 3-65D, etc.) for a period of 52 weeks as measured by physical inspection using a spatula.

Samples without mineral suspending agent (Samples-1-65-A; 2-65-A; 3-65A; etc.) were hard packed within 2 weeks time.

EXAMPLE 3

Titanium Dioxide ($TiO_2$) slurries containing 75.2%, 76.4% and 77.8% solids were dispersed using 0.10%-0.30% by weight of AG. The slurries were labeled as follows: Slurry #1: 75.2% $TiO_2$, Slurry #2: 76.4% $TiO_2$, Slurry #3: 77.8% $TiO_2$.

TABLE 3

Titanium dioxide slurry samples

| Sample | Sw solids weight percent (%) | AG weight relative to solids weight | | | |
| --- | --- | --- | --- | --- | --- |
| | | A | B | C | D |
| 1 | 75.2 | 0.15 | 0.20 | 0.25 | 0.30 |
| 2 | 76.4 | 0.15 | 0.20 | 0.25 | 0.30 |
| 3 | 77.8 | 0.15 | 0.20 | 0.25 | 0.30 |

Sw = Solids weight percentage.
AG = (ActiGel 208 ®, available from Active Mineral International).
The nomenclature is as follows: Sample-#- (letter A, B, C, D). The # denotes the solids weight percentage yy %, in which yy % = 75.2%, 76.4%, or 77.8%; and the Letter A, B, C, D represents the amount of AG. For example, Sample 1-A has 75.2% solids weight percent, and 0.15% of AG. Sample 3-C has 77.8% solids weight percent, and 0.25% of AG, etc.

Brookfield viscosity measurements were made of these slurries under the conditions noted above. These results are in FIG. 6A-G, which are plots of viscosity ($\eta$) versus the Brookfield RPM. It is clear from observing the data that the mineral suspending agent raised the low shear viscosity preferentially, which accounts for the elimination of settling and syneresis behavior.

The mineral suspending agent increased low shear viscosity to eliminate pigment settling. This was especially apparent at higher $TiO_2$ loadings.

The data show that for the lowest amount of $TiO_2$ (75.2%), Samples-1-A-D (FIG. 6A), the level of mineral suspending agent did not provide as much low shear viscosity rise as it did for the higher levels of $TiO_2$ in the Samples-2-A-D (FIG. 6B) or Samples 3-A-D (FIG. 6C) (i.e., 76.4, 77.8 weight percent $TiO_2$). See also FIG. 6D comparing 0.15% AG for samples 1-3.

The use of mineral suspending agent makes it possible for the slurry maker to ship less water or other aqueous liquid phase to customers while not exceeding viscosity limits.

Figure 6A:
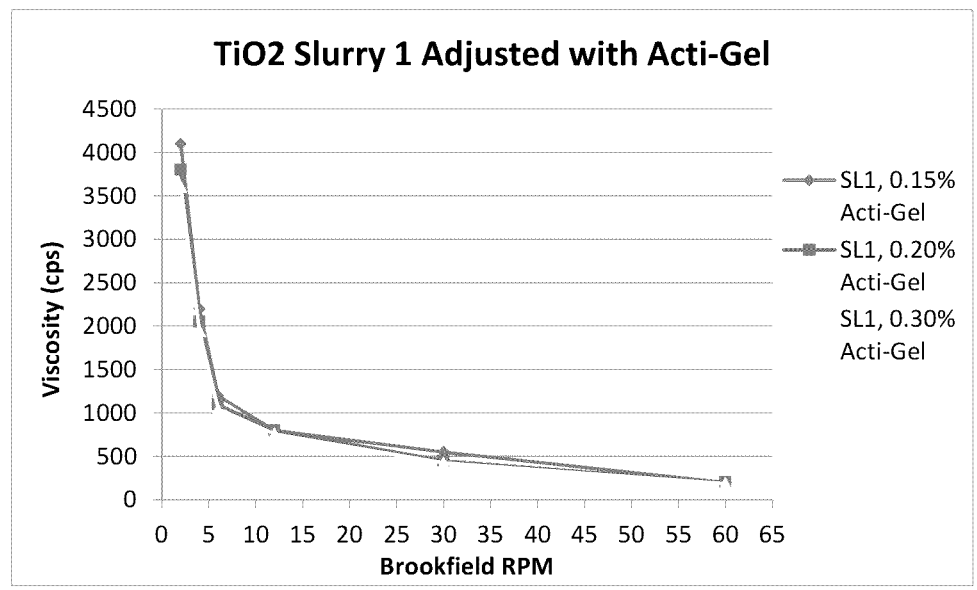
Figure 6B:
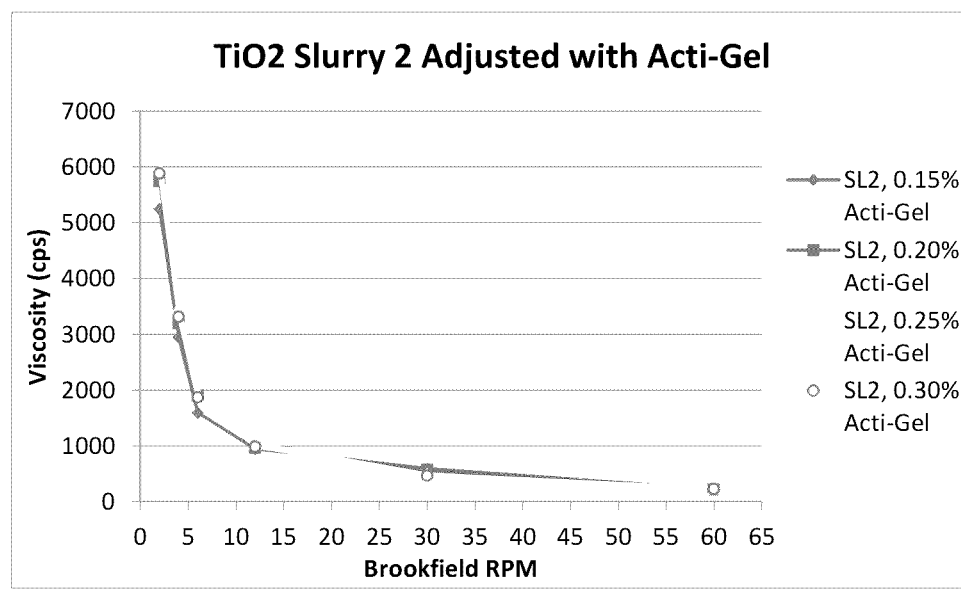
Figure 6C:
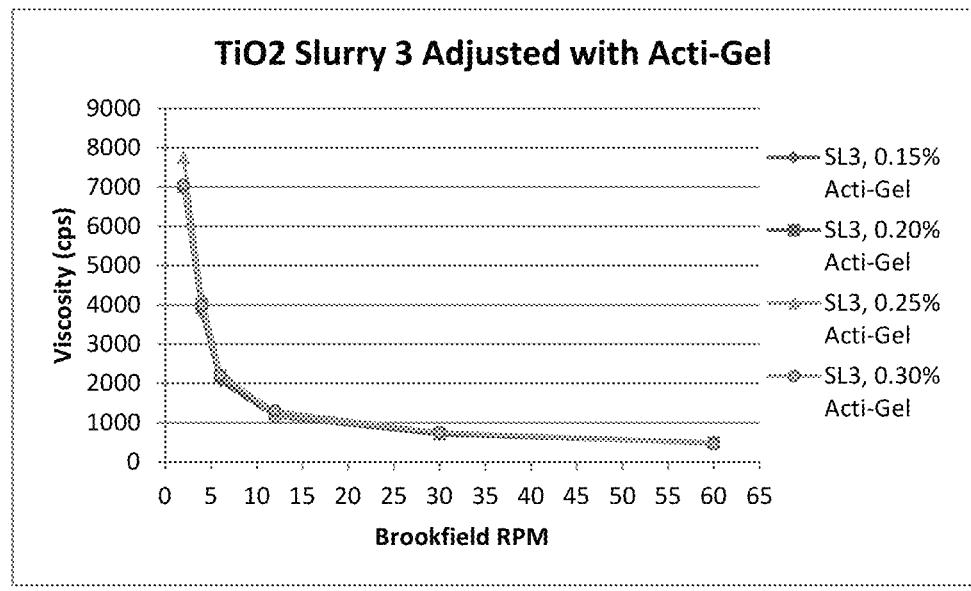
Figure 6D:
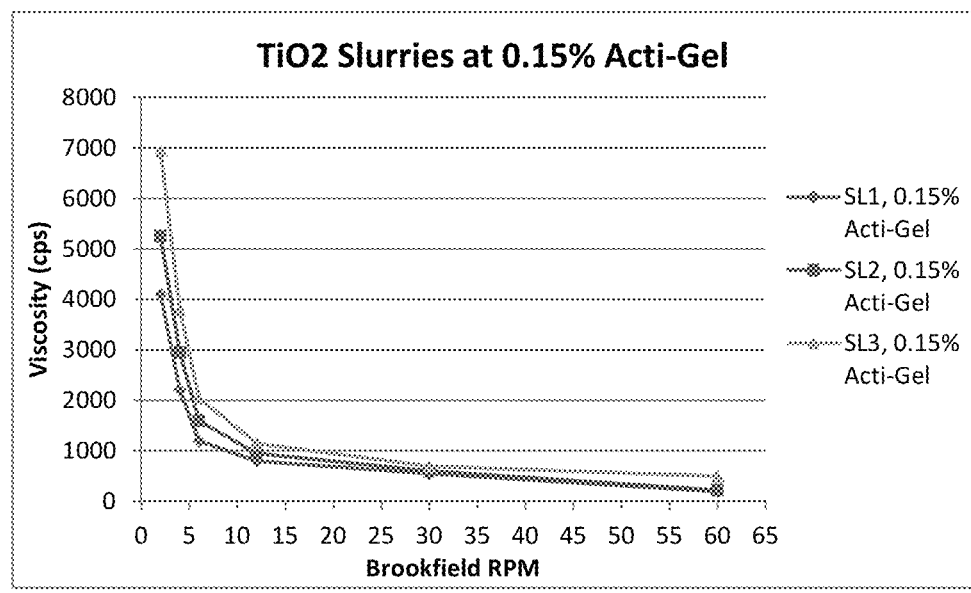
Figure 6E:
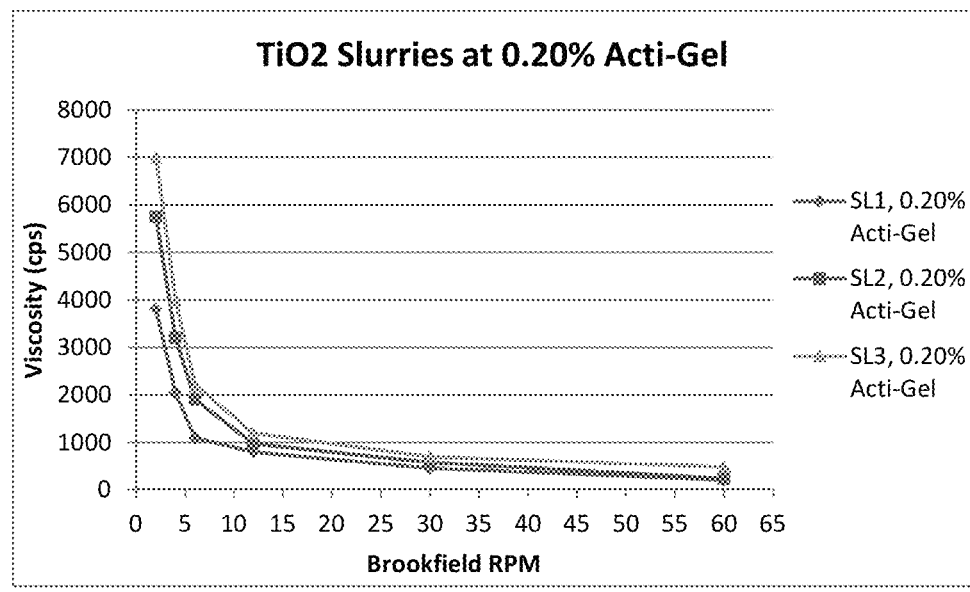
Figure 6F:
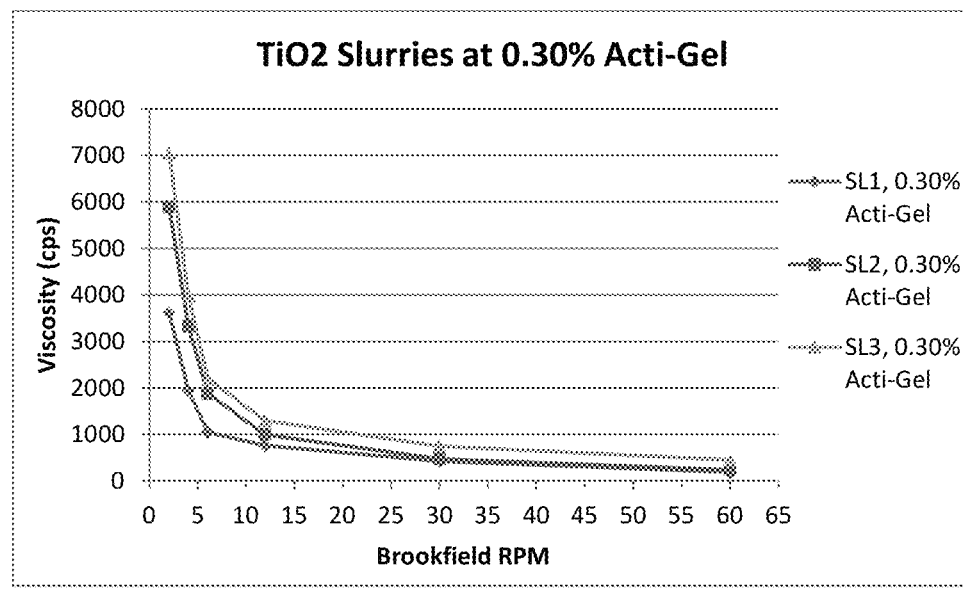

In Samples 3 (FIG. 6C), adding the mineral suspending agent to levels of 0.15% and 0.20% (Samples 3-A-B) were more effective than in the counterpart examples for Samples 1-A-B (FIG. 6A) or Samples 2-A-B (FIG. 6B). This is because less mineral suspending agent is needed at higher solids.

Mineral suspending agent addition levels of 0.25% and 0.30% in Samples 2-C-D were very effective. No hard packing occurred over a period of 26 weeks.

Brookfield Viscosities of all mineral suspending agent-stabilized Slurries were below 500 cps.

Mineral suspending agent- stabilized slurries allow for no hard packing, ease of flow under shear and less caking of the slurry to the sides of the vessel. This can translate to more efficient $TiO_2$ off loading.

EXAMPLE 4

Magnesium Hydroxide (MgOH) suspensions were dispersed in the presence of a mineral suspending agent AG (above) to compare the viscosities of mineral suspending agent-stabilized versus non-stabilized MgOH samples.

A 30% solids weight percent MgOH in water was made in water using a high speed mixer. The mineral suspending agent AG was then added at 2% and at 5%, by weight, to the MgOH suspension. This equates to 0.6% (Sample A) and 1.5% (Sample B) mineral suspending agent loading on a dry weight % basis.

The slurries were combined under high shear mixing.

These results are shown in FIG. 7, which plots viscosity (ii) versus Brookfield RPM (1/s).

An immediate rise in viscosity was noted in the curves in FIG. 7.

Upon shearing, Samples A-B exhibit excellent Bingham plastic flow properties (i.e., excellent flow under shear).

After 30 days of storage in a sealed container, the slurries were checked for suspension properties using the rod penetrometer test AMI-WI-ORE-003. The Samples A-B had some supernatant. No Hard Packing was observed over a period of 30 days.

EXAMPLE 5

A coal deposit contains a combination of minerals, sulfoxides, and ash. A pipeline is run at 55-60% solids weight percentage in an aqueous slurry. 3 million tons of solids is believed moveable per year using 400,000 gallons of water.

To the slurry is added palygorskite in an amount of 1.0% of the solids weight percentage and sepiolite in an amount of 0.01% of the solids weight percentage. 3 million tons of solids is believed moveable per year using 360,000 gallons of water.

Furthermore, the amount of electricity used to pump the slurry is decreased by about 10% based on a belief that the decrease in head pressure decreases electrical consumption.

EXAMPLE 6

Caustic red mud is a solid waste product produced in mining bauxite has a pH of about 12-13. Typically caustic red mud is pumped to be stored, e.g., in a holding pond. Pumping caustic red mud is extremely difficult.

Caustic red mud is suspended in water in the presence of 0.3% by weight of the solids of attapulgite. Caustic red mud is believed easily transported via flowing of the aqueous suspension. Attapulgite is believed to be able to withstand the caustic environment with minimal attrition.

EXAMPLE 7

Tailings are produced. Tailings are suspended in water in the presence of 0.2% by weight of the solids of sepiolite. Tailings is believed easily transported via flowing of the aqueous suspension.

EXAMPLE 8

A mineral deposit is discovered on the ocean floor approximately 2000 feet underwater. Solids are pumped up from the ocean floor using flexible piping and pumps. At the entrance of the flexible tubing is introduced 2% by solids weight percent of bentonite and 1% by solids weight percent of montmorillonite. The mineral suspending agent is believed to have facilitated transporting via the solids by flowing of the aqueous suspension.

Other embodiments of the invention will be apparent to those of ordinary skill in the art from consideration of the specification and practice of the embodiments disclosed herein. It is intended that the specification and examples be considered as nonlimiting, with a true scope and spirit of the invention being indicated by the following claims.

What is claimed is:

1. A method of transporting solid particulates in an aqueous suspension of the solid particulates, comprising dispersing solid particulates in an aqueous liquid in the presence of at least one mineral suspending agent, and transporting the solid particulates in the aqueous suspension of solid particulates a distance greater than or equal to 200 m,
   wherein the aqueous suspension of solid particulates comprises:
   an aqueous liquid, comprising water and optionally at least one other liquid, wherein the water is present in an amount greater than 50% v/v relative to the total volume of the water plus the volume of the at least one other liquid;
   solid particulates present in an amount ranging from 5% to 95% solids; and
   at least one mineral suspending agent present in an amount ranging from 0.05% to 0.15% by weight of the solid particulates, wherein the at least one mineral suspending agent is purified attapulgite substantially free of non-attapulgite minerals.

2. The method of claim 1, wherein the dispersing comprises agitating solid particulates in an aqueous liquid in the presence of the at least one mineral suspending agent.

3. The method of claim 2, wherein the aqueous suspension of solid particulates further comprises at least one additive.

4. The method of claim 3, wherein the at least one additive is chosen from:
   at least one wetting/dispersing agent for the solid particulates present in an amount ranging from 0.01% to 5% by weight of solid particulates;
   at least one dispersing agent for the at least one mineral suspending agent; and
   at least one neutralizer.

5. The method of claim 1, wherein the transporting comprises flowing the aqueous suspension of the solid particulates in a conduit such that the solid particulates are transported the distance.

6. The method of claim 5, wherein, during transporting and during the time the solid particulates are transported the distance, the flowing has a Renyolds number below 4,000.

7. The method of claim 5, wherein, during transporting, the flow changes in rate by 50%.

8. The method of claim 5, wherein, during transporting, the flowing is interrupted for a period of time greater than 8 hours and thereafter the flowing is resumed.

9. The method of claim 5, further comprising, after transporting, collecting the aqueous suspension of the solid particulates in a shipping container and thereafter hauling the container containing the aqueous suspension of the solid particulates a second distance greater than or equal to 100 km.

10. The method of claim 9, wherein hauling is achieved using a vehicle chosen from trains, trucks, planes, and ships.

11. The method of claim 9, thereafter further comprising thereafter transporting the solid particulates a third distance greater than or equal to 200 m by flowing the aqueous suspension of the solid particulates in a second conduit.

12. The method of claim 1, wherein the solid particulates are chosen from rocks, mineral colloids, organic colloids, mineraloids, and minerals.

13. The method of claim 1, wherein the aqueous suspension is a homogeneous aqueous suspension.

14. The method of claim 1, wherein the aqueous suspension is an inhomogeneous aqueous suspension.

15. The method of claim 1, wherein the aqueous suspension is a non-settling slurry.

16. The method of claim 1, wherein the at least one mineral suspending agent is present in an amount ranging from 0.05% to 0.1% by weight of the solid particulates.

17. A method of transporting solid particulates in an aqueous suspension of the solid particulates, comprising dispersing, in a container, solid particulates in an aqueous liquid in the presence of at least one mineral suspending agent, and thereafter hauling the container a distance greater than or equal to 100 km,
   wherein the aqueous suspension of solid particulates comprises:
   an aqueous liquid, comprising water and optionally at least one other liquid, wherein the water is present in an amount greater than 50% v/v relative to the total volume of the water plus the volume of the at least one other liquid;
   solid particulates present in an amount ranging from 5% to 95% solids; and
   at least one mineral suspending agent present in an amount ranging from 0.05% to 0.15% by weight of the solid particulates, wherein the at least one mineral suspending agent is purified attapulgite substantially free of non-attapulgite minerals.

18. The method of claim 17, wherein the at least one mineral suspending agent is present in an amount ranging from 0.05% to 0.1% by weight of the solid particulates.

19. A method of transporting solid particulates in an aqueous suspension of the solid particulates, comprising dispersing solid particulates in an aqueous liquid in the presence of at least one mineral suspending agent, and transporting the solid particulates in the aqueous suspension of solid particulates a distance greater than or equal to 200 m in a pipeline,
   wherein the aqueous suspension of solid particulates comprises:
   an aqueous liquid, comprising water and optionally at least one other liquid, wherein the water is present in an amount greater than 50% v/v relative to the total volume of the water plus the volume of the at least one other liquid;
   solid particulates present in an amount ranging from 5% to 95% solids; and
   at least one mineral suspending agent present in an amount ranging from 0.05% to 0.15% by weight of the solid particulates, wherein the at least one mineral suspending agent is purified attapulgite substantially free of non-attapulgite minerals.

20. The method of claim 19, wherein the at least one mineral suspending agent is present in an amount ranging from 0.05% to 0.1% by weight of the solid particulates.

* * * * *